(12) United States Patent
Shekh-Yusef et al.

(10) Patent No.: US 10,075,494 B2
(45) Date of Patent: Sep. 11, 2018

(54) PUSHING GRAPHICAL USER INTERFACE WIDGETS FOR COMMUNICATION DEVICES

(71) Applicant: Avaya Inc., Santa Clara, CA (US)

(72) Inventors: Rifaat Shekh-Yusef, Belleville (CA); Gordon R. Brunson, Broomfield, CO (US); Milos Pujic, Belleville (CA)

(73) Assignee: Avaya Inc., Santa Clara, CA (US)

( * ) Notice: Subject to any disclaimer, the term of this patent is extended or adjusted under 35 U.S.C. 154(b) by 266 days.

(21) Appl. No.: 14/707,873

(22) Filed: May 8, 2015

(65) Prior Publication Data
US 2016/0330254 A1    Nov. 10, 2016

(51) Int. Cl.
*G06F 15/16*     (2006.01)
*H04L 29/06*    (2006.01)
*H04L 29/08*    (2006.01)

(52) U.S. Cl.
CPC ...... *H04L 65/4061* (2013.01); *H04L 65/1006* (2013.01); *H04L 67/02* (2013.01); *H04L 67/38* (2013.01)

(58) Field of Classification Search
CPC .......................... H04L 65/1006; H04L 67/02
USPC ...................................................... 709/227
See application file for complete search history.

(56) References Cited

U.S. PATENT DOCUMENTS

| 7,512,880 | B2 * | 3/2009 | Morris | G06F 17/30899 709/206 |
| 2005/0188110 | A1 * | 8/2005 | Hollatz | H04L 29/06027 709/244 |
| 2007/0150480 | A1 | 6/2007 | Hwang et al. | |
| 2007/0266093 | A1 | 11/2007 | Forstall et al. | |
| 2009/0271778 | A1 * | 10/2009 | Mandyam | G06Q 10/06 717/171 |
| 2010/0325201 | A1 * | 12/2010 | Chitturi | H04L 67/125 709/203 |
| 2011/0125910 | A1 | 5/2011 | Sueda et al. | |
| 2011/0161409 | A1 * | 6/2011 | Nair | G06F 8/38 709/203 |
| 2011/0271207 | A1 * | 11/2011 | Jones | H04W 4/206 715/753 |

(Continued)

OTHER PUBLICATIONS

U.S. Appl. No. 14/707,839, filed May 8, 2015, Shekh-Yusef et al.
U.S. Appl. No. 14/721,783, filed May 26, 2015, Shekh-Yusef et al.

*Primary Examiner* — Phuoc Nguyen
(74) *Attorney, Agent, or Firm* — Sheridan Ross P.C.

(57) ABSTRACT

A first Session Initiation Protocol (SIP) REFER message is sent by an application server to a User Agent (UA). A UA is typically in a communication device, such as a telephone or personal computer. The first SIP REFER message requests the UA to provide a unique Uniform Resource Identifier (URI) for an instance of a networked application. For example, a networked application may be a call recording application. In response to sending the first SIP REFER message, a SIP NOTIFY message with the URI for the instance of the networked application is received by the application server. The application server sends a second SIP REFER message to the UA using the URI. The second SIP REFER message includes information for managing a widget. A widget is object, such as a button or sound. The widget is then displayed or played on a communication device according to a set of rules.

19 Claims, 5 Drawing Sheets

(56) References Cited

U.S. PATENT DOCUMENTS

| | | |
|---|---|---|
| 2012/0229473 A1 | 9/2012 | Tam |
| 2012/0233560 A1 | 9/2012 | Schneider et al. |
| 2015/0019991 A1 | 1/2015 | Kristjansson |
| 2015/0067819 A1* | 3/2015 | Shribman ............... H04L 67/06 726/12 |

* cited by examiner

PUSHING GRAPHICAL USER INTERFACE WIDGETS FOR COMMUNICATION DEVICES

TECHNICAL FIELD

The systems and methods disclosed herein relate to communication devices and in particular to managing graphical elements of communication devices.

BACKGROUND

Today, communication devices, such as telephones, are becoming increasingly complex. As more and more features are added, the complexity increases exponentially. As a result, it has become increasingly more difficult to continually support additional features. Even simple changes can cause long delays and difficulty in locating problems. The more complicated the software in the communication devices, the longer and more complex the development and testing process becomes. This results in increased costs and lower quality software.

SUMMARY

Systems and methods are provided to solve these and other problems and disadvantages of the prior art. A first Session Initiation Protocol (SIP) REFER message is sent by an application server to a User Agent (UA). A UA is typically in a communication device, such as a telephone or personal computer. The first SIP REFER message requests the UA to provide a unique routable Uniform Resource Identifier (URI) for an instance of a networked application that is to be hosted by the endpoint. For example, a networked application may be a call recording application. In response to sending the first SIP REFER message, a SIP NOTIFY message with the URI for the instance of the networked application is received by the application server. The application server sends a second SIP REFER message to the UA using the URI. The second SIP REFER message includes information for managing a widget. A widget is object, such as a button or sound. The widget is then displayed or played on a communication device according to a set of rules.

This allows networked applications to provide new services to communication devices without modifying the communication device software. The communication device is unaware of the semantics of the network application. The end result is a simplified development process that separates development of networked applications from the communication devices.

DETAILED DESCRIPTION

Figure 1:
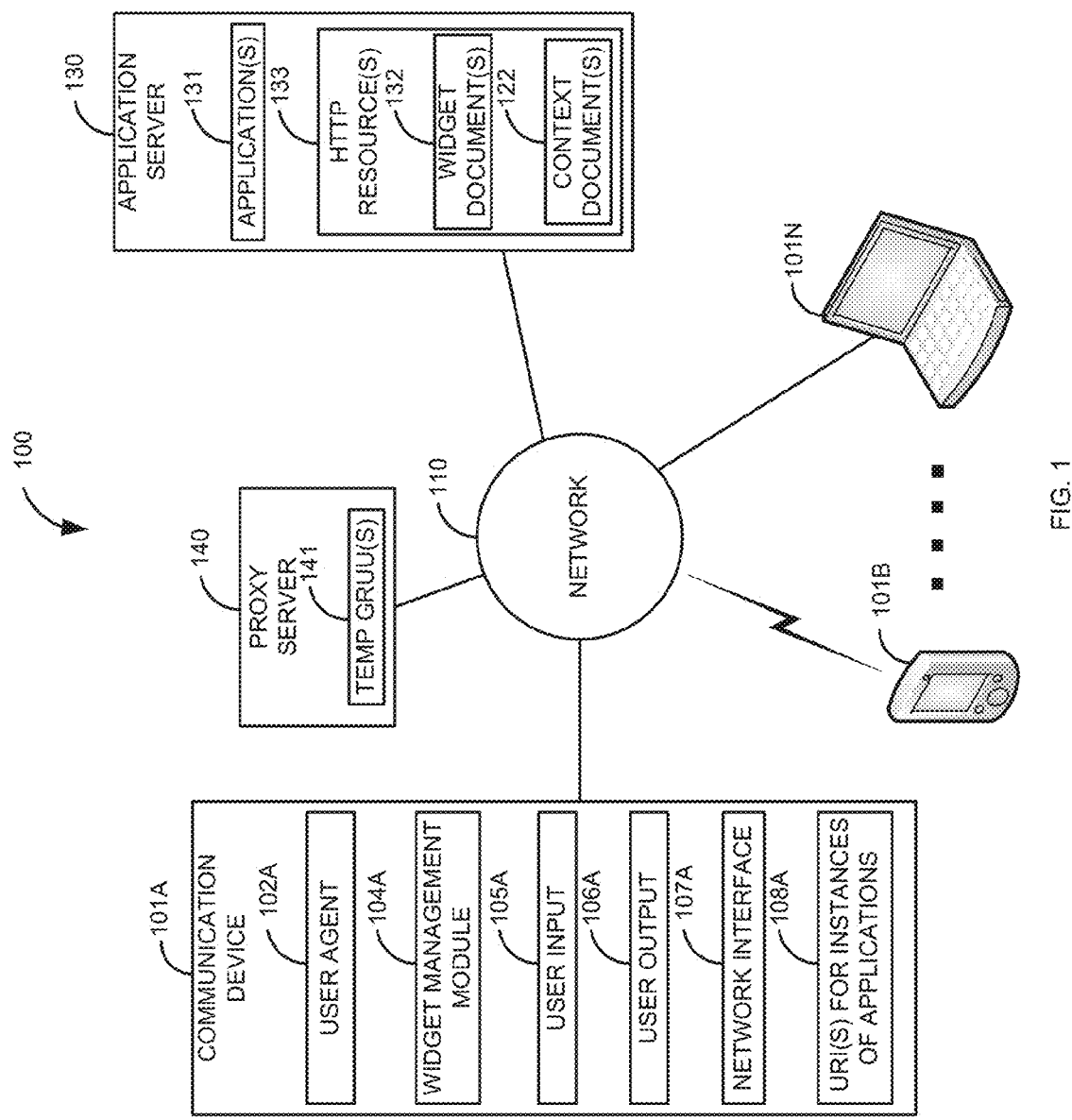
FIG. 1 is a block diagram of a first illustrative system for managing widgets on a communication device.

FIG. 1 is a block diagram of a first illustrative system 100 for managing widgets on a communication device 101. The first illustrative system 100 comprises communication devices 101A-101N, a network 110, an application server 130, and a proxy server 140.

The communication device 101 can be or may include any device that can communicate on the network 110, such as a Personal Computer (PC), a telephone, a video system, a cellular telephone, a Personal Digital Assistant (PDA), a tablet device, a notebook device, a conference bridge, and the like. As shown in FIG. 1, any number of communication devices 101A-101N may be connected to the network 110, including only a single communication device 101.

The communication device 101A further comprises a user agent 102A, a widget management module 104A, a user input 105A, a user output 106A, a network interface 107A, and Universal Resource Identifiers (URIs) of application instances 108A. The communication devices 101B-101N are not shown comprising the elements 102-108. However, in some embodiments, the communication devices 101B-101N may also include the elements 102-108 or a subset of the elements 102-108.

The user agent 102A can be or may include any hardware/software that can manage resources within the communication device 101. For example, the user agent 102A can manage protocols/resources within the communication device 101A.

The widget management module 104A can be or may include any hardware/software that can manage widgets for the communication device 101A. A widget is an object, such as a button, a menu, a menu bar, an icon, a tab, a text, a text field for entering text, a cursor, a window, a picture, sound, vibration, and/or the like. The widget management module 104A manages when and how various widgets, for the various applications 131, are displayed, played, or vibrated on the communication device 101A.

The user input 105A can be or may include any hardware that allows a user to provide input to the communication device 101A, such as, a mouse, a trackball, a touch screen, a microphone, a keyboard, a key pad, a touch pad, and/or the like. The user output 106A can be or may include any hardware that provides output to a user, such as a visual display, a speaker, a vibrator, and/or the like.

The network interface 107A can be or may include any hardware that allows the communication device 101A to communicate with the network 110, such as an Ethernet Interface, a wireless interface, a WiFi interface, a fiber optic interface, a cellular interface, a wired interface, and/or the like. The network interface 107A may include multiple network interfaces 107A.

The URIs for application instances 108A are unique routable addresses that can be used to specifically identify a particular instance of a network application 131. The communication device 101A will have or can generate a URI for each application instance 108A (e.g., a URI for a call recording application instance 131 and a URI for a call forwarding application instance 131).

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), email protocols, text messaging protocols, Instant Messaging protocols, video protocols, Hyper Text Transfer Protocol (HTTP), and/or the like. Thus, the network 110 is an electronic communication network that allows for sending of messages via packets and/or circuit switched communications.

The application server 130 can be or more may include any server that can support applications 131, such as proxy server 140, a PBX, a communication server, a communication manager, a web server, and/or the like. The application server 130 further comprises application(s) 131 and HTTP resource(s) 133.

The application(s) 131 can comprise one or more networked applications 131 that provide a variety of services, such as a call recording application, a call forwarding application, a call forking application, a Do Not Disturb (DND) application, a email application, an Instant Messaging application, a text messaging application, a voice mail application, a conferencing application, a billing application, a service application, and/or the like. The application(s) 131 can be implemented in a variety of ways, such as in a Back-to-Back User Agent (B2BUA), as individual applications 131, and/or the like. The applications 131 can have multiple instances. For example, a call forwarding application 131 can have a separate instance (i.e., a separate thread of the application 131) running for each communication device 101A-101N. When referring to application 131 or an instance of an application 131, the terms are used interchangeably herein.

The HTTP resource(s) 133 can be or may include any HTTP resources that the user agent 102 can use to discover the application 131 and their associated widgets. The HTTP resource(s) 133 contain the widget document(s) 132 and the context document(s) 122. The HTTP resource 133 is shown as part of the application server 130. However, in other embodiments, the HTTP resource 133 may be on a server that is separate from the application server 130, such as, on a web server.

The context document 122 is a document, such as an Extensible Markup Language (XML) document, text file, binary file, and/or the like that identifies the widgets for the particular instance of the application 131. The context document 122 for each instance of the application 131 may be different depending upon the specific features supported/configured for the instance of the application 131. For example, the user of the communication device 101A may be configured to use different features of a call recording application 131 than the user of the communication device 101B. Thus, the user of the communication device 101A may see different graphical widgets than the user of the communication device 101B based on the configured differences.

The widget document(s) 132 is a document that defines the widgets for an application 131. The widget document(s) 132 may be in a similar format to the context document(s) 122 or in a different format. The widget document(s) 132 may comprise individual widget documents 132 for each application 131. For example, if there are ten different applications 131, then there may be ten corresponding widget documents 132, one for each specific application 131. The widget document(s) 132 may identify multiple widgets for an instance of the application 131.

In FIG. 1, the context document(s) 122 and the widget document(s) 132 are shown as both on the application server 130. However, in other embodiments, the context document(s) 122 and the widget document(s) 132 may be located on different servers. In some embodiments, the context document 122 and the widget documents 132 may be included in the same document.

The proxy server 140 can be any hardware/software that can provide proxy services for the communication devices 101A-101N. For example, the proxy server 140 may be a SIP proxy server 140 for the communication devices 101A-101N. The proxy server 140 further comprises temporary Globally Routable User Agent URI (temp GRUU) 141. The temp GRUU 141 is a temporary address that can be used as a URI for an instance of the application 108.

Figure 2:
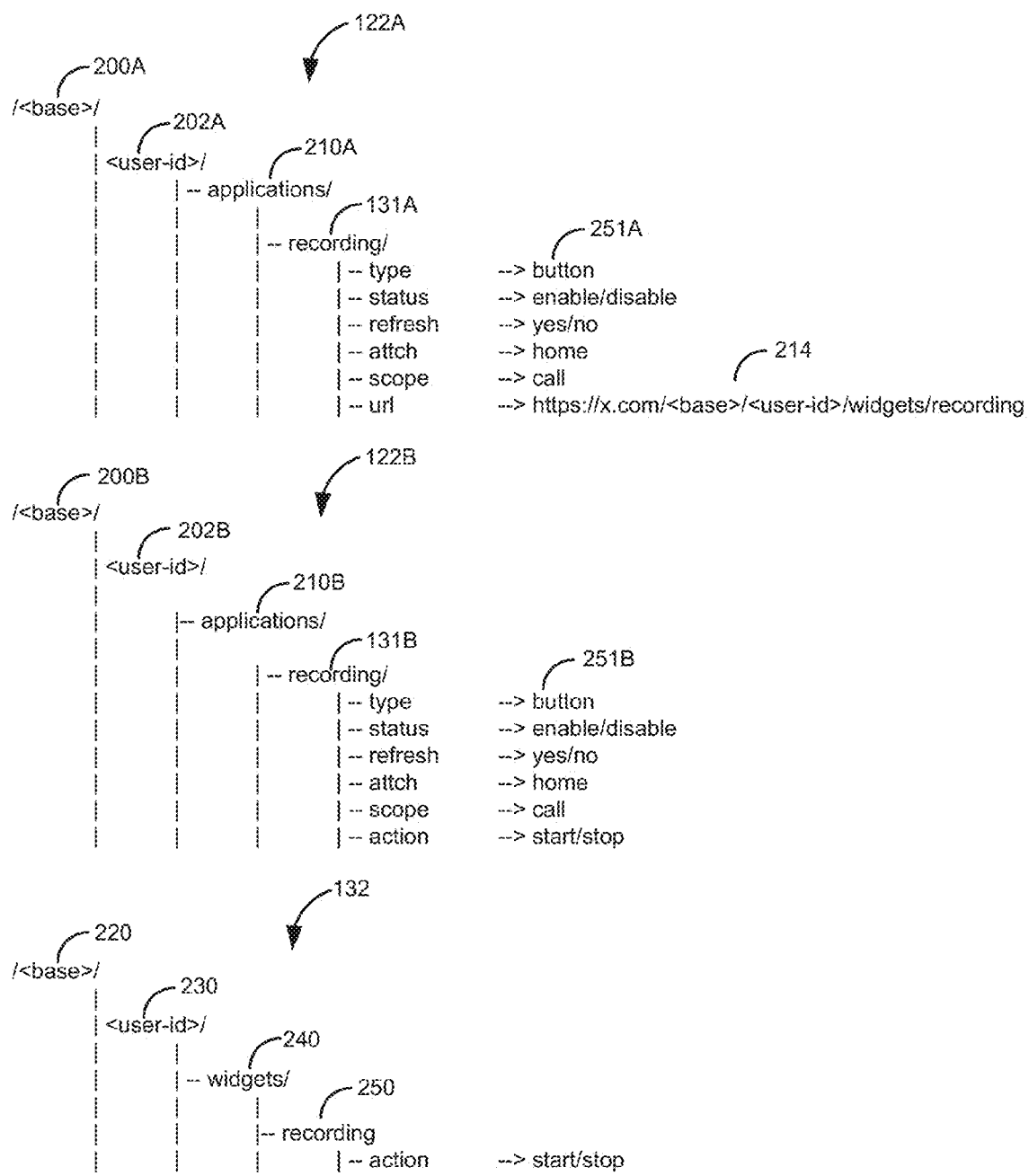
FIG. 2 is a diagram of a context document and a widget document for a communication device.

FIG. 2 is a diagram of two different context documents (122A and 122B) and a widget document 132 of an application 131. In this example, the application 131 is a call recording application 131 illustrated by the references 131A/131B. The context documents 122A/122B are shown with a tree structure that defines a base level 200A/200B, a user-id definition 202A/202B, an application definition 210A/210B, and a call recording application 131A/131B. The user agent 102A retrieves the context document 122A/122B to identify the widgets or a widget document 132 that identifies the widgets.

When the communication device 101 retrieves the context document 122 (as described in FIG. 3), the user agent 102 parses the application definition 210 to identify the widgets or a location of a widget document 132 that for the application 131. In this example, the context documents 122A and 122B are defined differently to illustrate different ways that the context document 122A/122B can be defined.

The functionality of the call recording application 131A is defined in the widget fields 251A. In this example, the recording application 131A has a button (indicated by the type field) that can be enabled/disabled (indicated by the status field), and can be refreshed to indicated whether a call is being recorded or not (indicated by the refresh field). The button also has an attachment point of home. In this example, home refers to a home (or main) screen on the communication device 101. For example, the home screen is displayed on a telephone after the telephone has been initialized.

The scope field is used to further determine when to display the button via the user output 106. In this example, the scope is when a call is active. For example, the call recording button will be displayed on the home window (attachment point) of the telephone (101) when a user initiates a call (within scope). The user can then select the call recording button to record the call any time when the call is active. When the user ends the call, the call recording button is no longer within scope. The widget management module 104 then removes the call recording button from the home screen.

The widget field 251A (or 251B) may include different fields and/or additional fields depending upon the type of widget being defined by the application 131. For example, the widget field 251A may have additional fields that further define the button, such as a text for the button, a size field to define dimensions of the button, an icon for the button, and/or the like. The type may vary based on the particular widget for the instance of the application 131. For example, the type may be a menu, an icon, a graphic, a menu, a picture, a menu bar, a window, a picture, a sound, a vibration, a combination of these (e.g., a menu bar with a menu), and the like.

The attachment point may be based on activation of a displayed device object, such as a voice call window (e.g., attaching a button to the voice call window), a video call window, a home screen, a contact or list of contacts, a call log, a menu item (i.e., inserting a new menu item into a menu), a feature list, an instant message window, an email window, a button, an image, a text field, a tab, a panel, a played sound, a vibration, and/or the like.

The scope for displaying the widget may be defined based on various types of parameters. For example, the scope may be based on detecting a phrase spoken in a communication session. In this example, the attachment point is a voice call window and the scope is detection of a word or phrase in the voice call. As a result, the widget (e.g., a button) is attached to the voice call window when the word or phrase is detected in the voice call. For example, a call monitoring application 131 may detect the phrase and send a message to the widget management module 104 to enable a button that provides information on the phrase that was detected. Alternatively, the scope may be based on various kinds of events, such as detection of the user sending an email to a particular user, detection of an Instant Messaging session with a particular user, establishment of a video call, termination of a call, call forwarding, call forking, call conferencing, and/or the like.

For the context document 122A the user agent 102 identifies the URL field 214 so the user agent 102 can download the widget document 132 from the location pointed to by the URL field 214. The URL field 214 is an address for the widget document 132 (which contains the associated widget(s)) for the call recording application 131A. The user agent 102 uses the widget document 132 to determine that the call recording application 131A has a single call recording widget 250. In this example, the user agent 102 conveys the status of the widget (e.g., a button push) by changing the status in the context document (e.g., as described in step 324 described in FIG. 3).

If there were multiple widgets in the call recording application 131A, additional fields would be defined. For example, if the call recording application 131B had a recording button and a password field, in addition to the recording widget 250, there would be an additional widget field for the password field at the same level in the widget document 132.

The context document 122B is defined to include the widget field 251B, that is identical to the widget field 251A defined in the widget document 132. The difference is that instead of referencing the widget document 132, the context document 122 defines the widget for the call recording application 131B directly. When the user agent 102 receives the context document 122B, the widget management module 104 can get the widgets directly from the context document 122B.

Although not shown, the defined number of widgets for each application 131A and 131B may include any number of defined widgets. For example, the recording application 131A may also include a text box for the user to enter a password to record the call.

In addition, the context document 122 or the widget document 132 may define sound widgets. A sound widget may have an attachment point and scope like a graphical widget. For example, the sound widget may have an attachment point to a particular window and scope of when the window is closed (the sound is played when the particular window is closed). The widget field 251 may define a sound that is played when a graphical widget comes within scope and is displayed, such as a beep, ring tone, song and/or the like. The type of sound may be defined in the widget field 251.

In addition, the context document 122 or the widget document 132 may define vibration widgets. A vibration widget may have an attachment point and scope like a graphical/sound widget. For example, a vibration widget may have an attachment point of a menu and a scope of when a menu item is selected. Thus, a vibrator in the communication device 101 will vibrate when the menu item is selected. The vibration widget may cause the vibrator to vibrate in a specific pattern based on the scope/attachment point.

Figure 3:
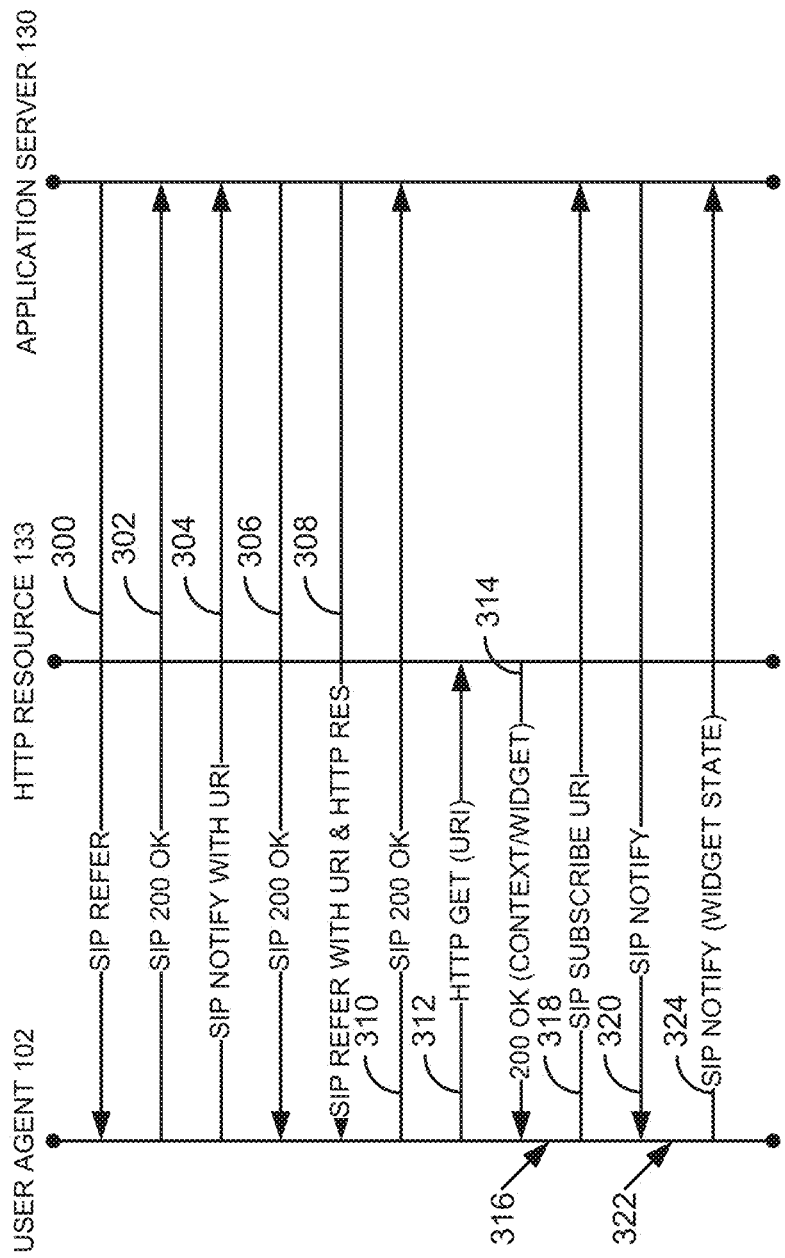
FIG. 3 is a flow diagram of a process for managing widgets on a communication device.
Figure 4:
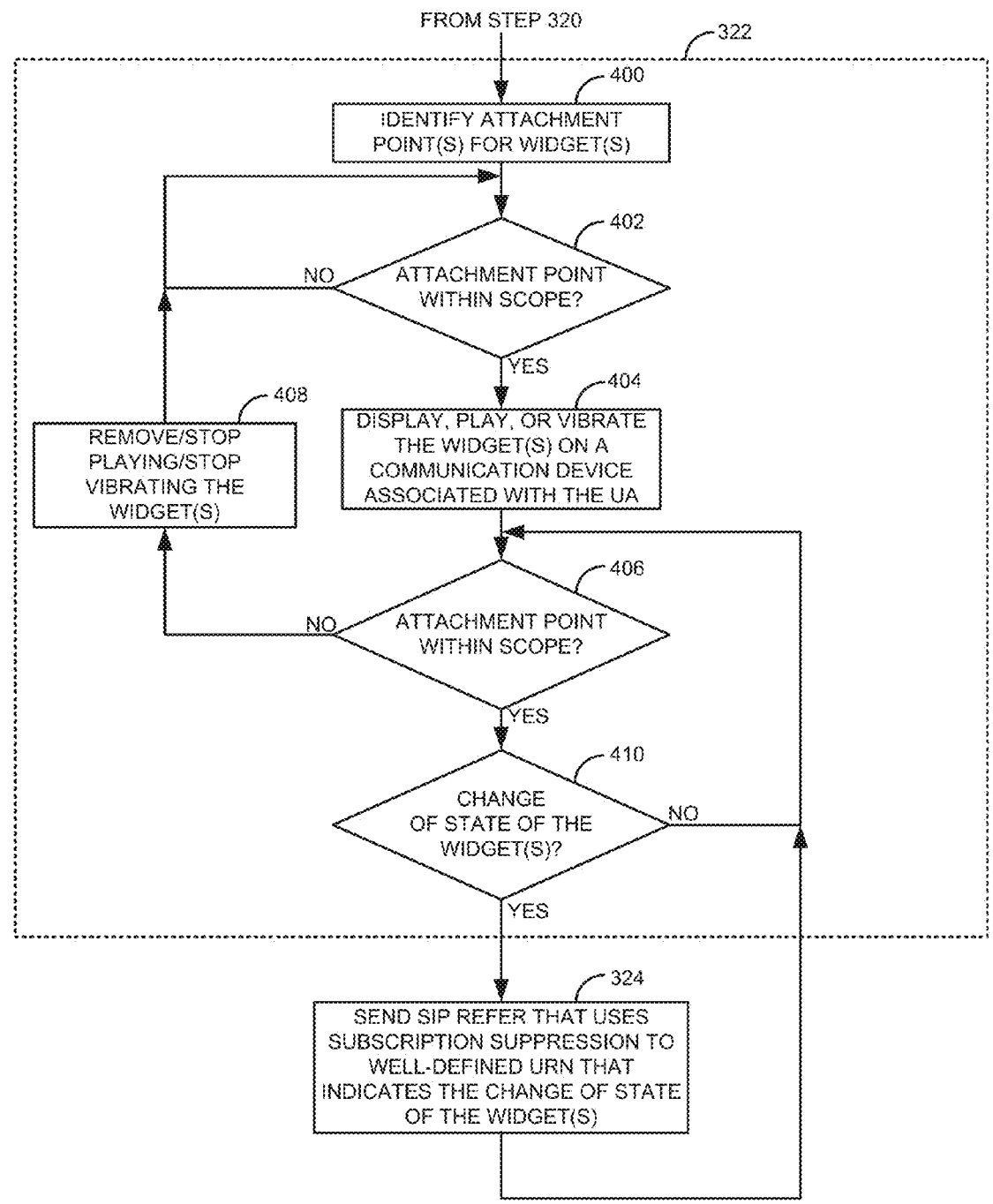
FIG. 4 is a flow diagram of a process for determining an attachment point for a scope of a widget.
Figure 5:
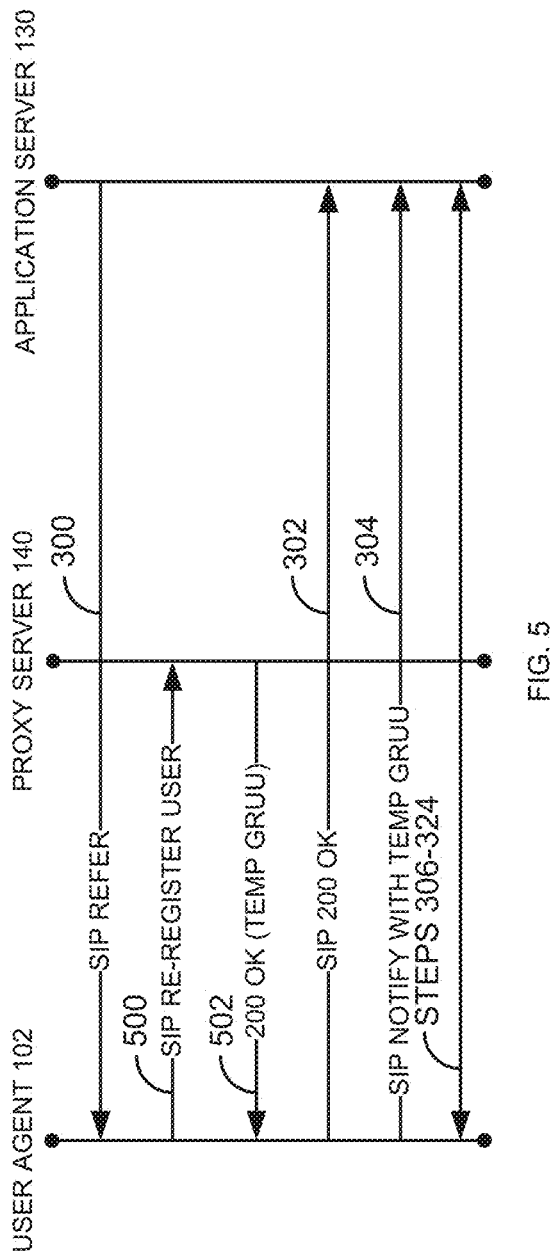
FIG. 5 is a flow diagram of a process for getting a temporary Globally Routable user agent URI for a networked application.

FIG. 3 is a flow diagram of a process for managing graphical user interface widgets on a communication device 101. Illustratively, the communication devices 101A-101N, the user agent 102, the widget management module 104, the user input 105, the user output 106, the network interface 107, the application server 130, the application(s) 131, and the proxy server 140 are stored-program-controlled entities, such as a computer or processor, which performs the method of FIGS. 3-5 and the processes described herein by executing program instructions stored in a non-transient computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300 when the application server 130 sends a SIP REFER message to the user agent 102. In one embodiment, the SIP REFER of step 300 is sent using a well-defined Uniform Resource Name (URN). The SIP REFER message of step 300 requests the user agent 102 to provide a unique Uniform Resource Identifier (URI) for an instance of the application 108. The user agent 102 sends a SIP 200 OK in step 302. The user agent 102 sends a SIP NOTIFY with a URI for the instance of the application 108 in step 304. In response, the application server 130 sends a SIP 200 OK in step 306.

In response to receiving the URI for the instance of the application 108 in step 304, the application server 130 sends a SIP REFER with the URI of the instance of the application 108 in step 308. In this embodiment, the SIP REFER includes a referral to an HTTP resource 133. The referral to the HTTP resource 133 is an address (e.g., a Universal Resource Locator (URL)) of where to get the context document 122. The user agent 102 sends a SIP 200 OK to acknowledge receipt of the SIP REFER (of step 308) in step 310.

In an alternative embodiment, the SIP REFER of step 308 may also include the context document 122 along with the referral to the HTTP resource 133 (for the widget document 132). In other embodiments, the SIP REFER of step 308 may include the context document 122 and a widget document 132 (negating the need for steps 312 and 314). In another embodiment, the SIP REFER in step 308 can refer the user agent 102 to both the context document and the widget document 132.

The user agent 102 sends a HTTP GET with the URI of the instance of the application 108 to the HTTP resource 133 in step 312. In response, the HTTP resource 133 sends a HTTP 200 OK message in step 314. The HTTP 200 OK message of step 314 includes the context document 122 and optionally the widget document 132 (depending on implementation). If the context document 122 is similar to the context document 122B of FIG. 2, then there is no need for a widget document 132.

Alternatively, if only a context document 122 is in the 200 OK message and a widget document 132 is required (e.g., as described in FIG. 2, for the call recording application 131A), the user agent 102 can use the URL field 214 in the context document 122 to get the widget document 132 in a similar manner as the context document 122 (e.g., using an HTTP GET using the address in the URL field 214). Alternatively, the URL field may point to another context document 122 instead of a widget document 132 (e.g., similar to 122B).

Based on receiving the context document 122 and optionally the widget document 132 in step 314, widget management module 104 parses the context document 122 or the widget document 132 to identify each of the widgets for each of the applications 131 in step 316. In response, the widget management module 104 sends, to the application 131, a SIP SUBSCRIBE for the HTTP-monitor events related to the widget in step 318. When an event associated with the widget is detected by the application 131, the application 131 sends a SIP NOTIFY message in step 320 to notify the widget management module 104 of the event associated with the widget. For example, the event may be to enable a button or change a graphic on the button or to enable a sound widget to be played. The process of step 318 is completed for each widget in the application 131. This allows the application 131 to send updates for each widget using the SIP NOTIFY of step 320.

Based on the context document 122 or widget document 132 for the application 131, the widget management module 104 determines the attributes and context for each widget in step 322, which eventually includes displaying the graphical widget (if the widget is a graphical widget) in the user output 106. The process of step 322 is described in further detail in FIG. 4. Upon detecting a change of state of the widget, the widget management module 104 sends the change of state of the widget to the application 131 in step 324. For example, if the user selects a menu, the selection of the menu is sent to the application 131. The user agent 102 can send the change of state using a SIP REFER message to a well defined Universal Resource Name (URN) in step 324. The SIP REFER can use a subscription-suppression method to avoid creation of a SIP dialog.

The above process of sending the SIP REFER to the URN with a subscription-suppression method can be implemented differently. For example, an HTTP Post may be used in place of the SIP REFER.

The process of step 300-324 is repeated for each application 131 that the user agent 102 supports. For example, if there were two different applications 131 (e.g., a call recording application and a call forwarding application), the process of steps 300-324 would be repeated for both applications 131.

FIG. 4 is a flow diagram of a process for determining an attachment point for a scope of a widget. The process of FIG. 4 is an exemplary embodiment of steps 322 and 324 of FIG. 3.

After receiving the SIP NOTIFY message in step 320, the widget management module 104 identifies an attachment point(s) for the widget(s) in step 400. The widget management module 104 identifies the attachment point(s) based on the context document 122 and/or widget document 132 as described in FIG. 2. The widget management module 104 determines if the attachment point is within a scope in step 402. If the attachment point is not within the scope in step 402, the process goes back to step 402.

Otherwise, if the attachment point is within the scope in step 402, the widget management module 104 renders the widget(s) and the widgets are displayed (graphical widgets), played (sound widgets) or vibrated (vibration widgets) on the communication device 101, via the user output 106 in step 404. The widget management module 104 determines if the attachment point is within scope in step 406. If the attachment point is no longer within scope in step 406, the widget management module 104 removes (graphical widgets), stops playing (sound widgets) stops vibrating (vibration widgets) the widget from the user output 106 in step 408 and the process goes back to step 402.

Otherwise, if the attachment point is within scope in step 406, the widget management module 104 determines if there is a change of state of the widget(s). For example, a change of state may be a button push, a selection of a menu, entering of text within a text box, movement of a cursor over an object, resizing a window, moving the widget, selection of a menu bar, and/or the like. If a change of state has not been detected in step 410, the process goes back to step 406.

Otherwise, if a change of state has been detected in step 410, the widget management module 104 sends a SIP REFER message that uses subscription suppression to a well defined Uniform Resource Name (URN) that indicates the change of state of the widget in step 324. The process then goes to step 406.

To illustrate, consider the following example using an enhanced call recording application 131. In this example, the call recording application 131 has two graphical widgets: 1) a call recording button (like previously described) and a pop-up window with two buttons. The call recording button has the same widget field 251B as shown in FIG. 2. In addition, the context document 122 for the call recording application 131 includes a widget field 251 for the pop-up window that has a type of window, a window size, a text field ("caller xxx has dropped from the call, do you want to continue recording?"), a first button field (yes), a second button field (no), an attachment point of home, and a scope of conference caller drops.

The application server 130 sends the SIP Refer to the user agent 102 to provide the URI for the instance of the networked application 108 in step 300. The user agent 102 responds with the SIP 200 OK in step 302. The user agent 102 sends the SIP NOTIFY message with the URI for the instance of the application 108 in step 304. The application server 130 sends the SIP 200 OK in step 306. The user agent 102 sends a HTTP GET message to the HTTP resource 133 in step 312. The HTTP resource 312 sends the 20 OK message that includes the context document 122. The widget management module 104 parses the context document 122 in step 316 to identify the call recording button and the pop-up window.

In response to determining that there is are two graphical widgets (call recording button and the pop-up window) for the call recording application 131B, the user agent 102 sends two SIP SUBSCRIBE messages (step 318) to be notified of any events associated with the call recording button and the pop-up window. The widget management module 104 identifies that the call recording button has an attachment point to the home screen of the communication device 101 in step 400.

From the home window of the communication device 101, the user (Jim) makes a call to a conferencing bridge that sets up a conference call to three users, Jack, Sally, and Jane. In response setting up the conference call, the widget management module 104 determines that the attachment point of the call recording button (call) is within scope in step 402. The call recording button is displayed on the user output 106 in step 404 to Jim.

The Jim selects the call recording button to record the conference call. In response to Jim selecting the call recording button, the widget management module 104 determines that there was a change of state of the call recording button (Jim selecting the call recording button) in step 410. The user agent 102 sends the SIP REFER message of step 324 to the call recording application 131. In response, the call recording application 131 starts to record the conference call between Jim, Jack, Sally, and Jane.

Sally drops from the conference call. The call recording application 131 detects that Sally has dropped from the conference call. In response, the call recording application 131 sends the SIP NOTIFY message of step 320 indicating that Sally has dropped from the conference call. The widget management module 104 determines in step 402 that the attachment point for the pop-up window is within scope (conference caller drops). The pop-up window is displayed in the user output 106 over the home screen (the attachment point for the pop-up window). The pop-up window states that Sally has dropped from the conference call and asks Jim if he wants to continue recording the conference call. Jim selects the no button on the pop-up window. The attachment point is no longer in scope for the pop-up window in step 406 and the pop-window is closed. The widget management module 104 sends the widget state of Jim selecting the no button to the call recording application 131 in step 324. The call recording application 131 stops recording the conference call and a recording of the conference call up to where Sally dropped from the conference call is sent to Jim's email.

In this example, the communication device 101 is unaware of semantics of the call recording application 131. All the communication device 101 is aware of is that the widgets (the call recording button and the pop-up window are displayed to a user and input is received from the user that is then conveyed to the call recording application 131. The advantage to this approach is that the complexities of the call recording application 131 can be developed separately without increasing the complexity of software in the communication device 101.

FIG. 5 is a flow diagram of a process for getting a temporary Globally Routable User Agent URI (temp GRUU) 141 for a networked application 131. The process of FIG. 5 goes between the steps 300 and 302 of FIG. 3. After receiving the SIP REFER message in step 300, the user agent 102 sends a SIP RE-REGISTER USER message to the proxy server 140. In response, the proxy server 140 sends a SIP 200 OK message with the temp GRUU 141. In one embodiment, the temp GRUU 141 has a unique appended parameter to make the temp GRUU 141 unique. The user agent 102 sends the SIP 200 OK message in step 302. The user agent 102 then sends the SIP NOTIFY of step 304 with the temp GRUU 141. The temp GRUU 141 is then used in the same manner as the URI for the instance of the application 108. The process continues with steps 306-324 as previously described.

The above descriptions use SIP and HTTP as primary protocols for sending and receiving of messages. However, in other embodiments, other protocols can be used. For example the process of FIGS. 3-5 may be implemented using WebRTC, H.323, and/or the like. The messages may be defined using custom protocols, thus the messages of FIGS. 3-5 may be implemented as generic messages.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   sending, by a microprocessor, a first SIP REFER message to a user agent (UA), wherein the first SIP REFER message requests the UA to provide a unique Uniform Resource Identifier (URI) for an instance of a networked application;
   in response to sending the first SIP REFER message, receiving, by the microprocessor, a SIP NOTIFY message with the URI for the instance of the networked application; and
   sending, by the microprocessor, a second SIP REFER message to the UA using the URI, wherein the second SIP REFER message includes information for managing a widget.

2. The method of claim 1, wherein the second SIP REFER message includes at least one of:
   (i) a referral to a Hypertext Transfer Protocol (HTTP) resource;
   (ii) a context document and the referral to the HTTP resource; and
   (iii) a context document and a widget document.

3. The method of claim 1, wherein the second SIP REFER message includes a referral to a HTTP resource and further comprising:
   sending, by the UA, a first HTTP GET to the HTTP resource;
   in response to sending the first HTTP GET to the HTTP resource, receiving, at the UA, a context document that defines the widget or a location of a widget document that defines the widget for use in the UA, wherein the widget communicates with the instance of the networked application.

4. The method of claim 3, wherein the context document defines a location of the widget document and further comprising:
   sending, by the UA, a second HTTP GET to the location of the widget document; and
   in response to sending the second HTTP GET to the location of the widget document, receiving, at the UA, the widget document that defines the widget.

5. The method of claim 1, wherein the second SIP REFER message includes a context document wherein the context document has a resource tree that defines a plurality of widgets.

6. The method of claim 1, wherein the widget is a graphical widget and further comprising:
   identifying an attachment point for the graphical widget, wherein the attachment point is associated with an activation of a communication device object;
   detecting that the attachment point is within a scope; and
   in response to detecting that attachment point is within the scope, displaying the graphical widget on a communication device associated with the UA.

7. The method of claim 6, further comprising:
   detecting a change of state in the graphical widget; and
   in response to detecting the change of state in the graphical widget, the UA sending a third SIP REFER message to the a well-defined Uniform Resource Name (URN), wherein the third SIP REFER indicates the change of state of the graphical widget and wherein the third SIP REFER message uses a subscription-suppression method to avoid the creation of a SIP dialog.

8. The method of claim 1, wherein the URI for the instance of the network application is a temporary Globally Routable user agent URI (temp GRUU).

9. The method of claim 8, further comprising:
sending a SIP RE-REGISTER user message to a proxy server to get the temp GRUU; and
receiving the temp GRUU from the proxy server.

10. The method of claim 1, wherein the widget is one of a graphical widget, a sound widget, and a vibration widget.

11. The method of claim 1, wherein the URI is a public Globally Routable user agent URI (public GRUU) for the UA with an appended unique parameter.

12. The method of claim 1, wherein the UA is unaware of semantics of the network application.

13. A system comprising:
a memory,
a microprocessor in communication with the memory, the microprocessor executing an application server that:
sends a first SIP REFER message to a user agent (UA), wherein the first SIP REFER message requests the UA to provide a unique Uniform Resource Identifier (URI) for an instance of a networked application, receives a SIP NOTIFY message with the URI for the instance of the networked application in response to sending the first SIP REFER message, and sends a second SIP REFER message to the UA using the URI, wherein the second SIP REFER message includes information for displaying a widget.

14. The system of claim 13, wherein the second SIP REFER message includes at least one of:
(i) a referral to a Hypertext Transfer Protocol (HTTP) resource;
(ii) a context document and the referral to the HTTP resource; and
(iii) a context document and a widget document.

15. The system of claim 13, wherein the second SIP REFER message includes a referral to a HTTP resource and wherein the UA:
sends a first HTTP GET to the HTTP resource and receives a context document that defines the widget or a location of a widget document that defines the widget for use in the UA in response to sending the first HTTP GET to the HTTP resource, wherein the widget communicates with the instance of the networked application.

16. The system of claim 15, wherein the context document defines a location of the widget document and wherein the UA sends a second HTTP GET to the location of the widget document and receives the widget document that defines the widget in response to sending the second HTTP GET to the location of the widget document.

17. The system of claim 13, wherein the widget is one of a graphical widget, a sound widget, and a vibration widget.

18. The system of claim 13, wherein the widget is a graphical widget, and wherein:
a widget management module identifies an attachment point for the graphical widget, wherein the attachment point is associated with an activation of a communication device object, detects that the attachment point is within a scope, and displays the graphical widget on a communication device associated with the UA in response to detecting that attachment point is within the scope.

19. The system of claim 18, wherein:
the widget management module detects a change of state in the graphical widget; and
the UA sends a third SIP REFER message to the a well-defined Uniform Resource Name (URN) in response to detecting the change of state in the graphical widget, wherein the third SIP REFER indicates the change of state of the graphical widget and wherein the third SIP REFER message uses a subscription-suppression method to avoid the creation of a SIP dialog.

* * * * *